Oct. 15, 1963     W. K. PRIESE     3,107,080
FLUID ACTUATED VALVE
Filed July 31, 1959     2 Sheets-Sheet 1
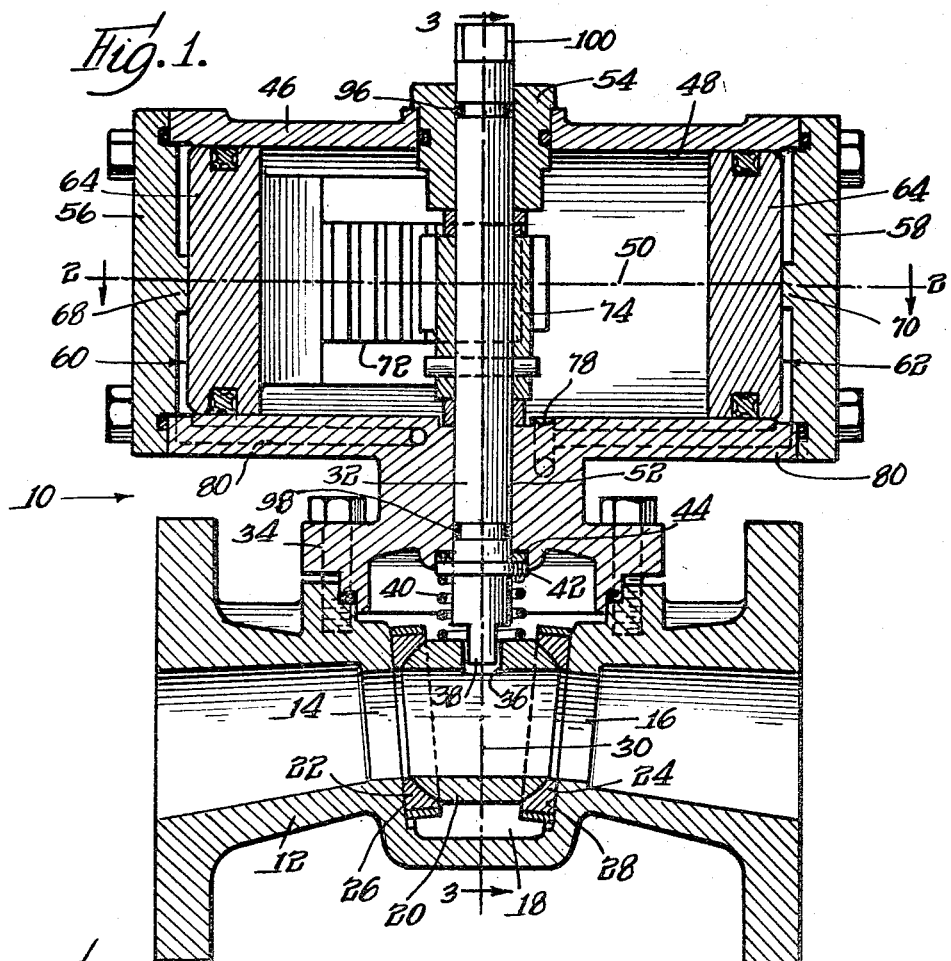
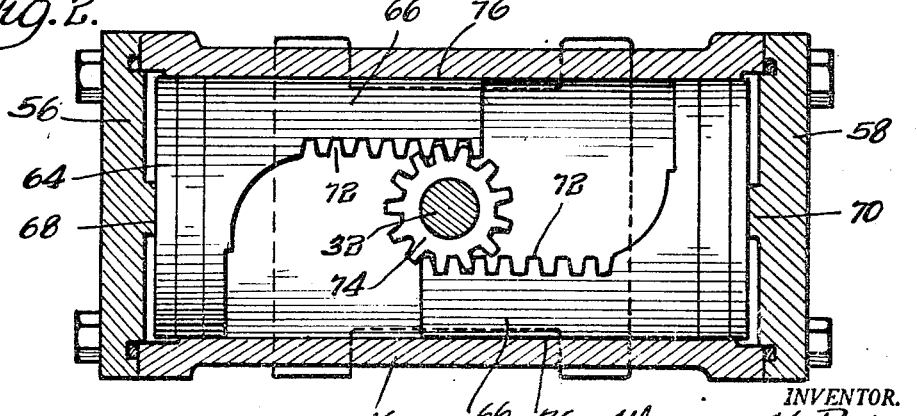
INVENTOR.
Werner K. Priese
BY
Olson & Trexler
Attys.

Oct. 15, 1963  W. K. PRIESE  3,107,080
FLUID ACTUATED VALVE
Filed July 31, 1959  2 Sheets-Sheet 2

INVENTOR.
Werner K. Priese
BY:
Olson & Trexler
Attys.

United States Patent Office 3,107,080
Patented Oct. 15, 1963

3,107,080
FLUID ACTUATED VALVE
Werner K. Priese, Barrington, Ill., assignor to Hills-McCanna Company, Chicago, Ill., a corporation of Illinois
Filed July 31, 1959, Ser. No. 830,896
2 Claims. (Cl. 251—31)

This invention relates to fluid operated valves.

One object of the invention is to provide a new and improved fluid operated valve in which rotatable valve control structure is operated by the pressure of a control fluid by improved means which generates a "pure" operating torque about an axis coinciding with the axis of the rotatable valve control structure and applies the operating torque to the rotatable control structure in a manner which greatly simplifies the problem of supporting and sealing rotary components of the valve while at the same time extending the service life of the valve by avoiding the development of bending forces in the rotary control structure and by avoiding the application of radial loads to the supports for the rotary control structure.

A further object is to provide an improved fluid operated valve, as recited in the above object, in which valve operating torque is developed from the pressure of operating fluid by improved and inherently powerful control means having an extremely compact, simple construction in which forces developed as an incident to operation of the valve are balanced against each other and distributed in a manner that effectively avoids wear on parts which move relative to each other.

Another object is to provide a compact, fluid operated valve as recited in the preceding object which, in the event of a loss of operating fluid pressure, will automatically return to a predetermined operational condition, which is "safe" in the environment in which the valve is used.

Other objects and advantages will be evident from the following description of the exemplary embodiment of the invention illustrated in the drawings, in which:

FIG. 1 is a vertical sectional view of a fluid control valve embodying the invention;

FIG. 2 is a sectional view taken along the line 2—2 of FIG. 1;

Figure 3:
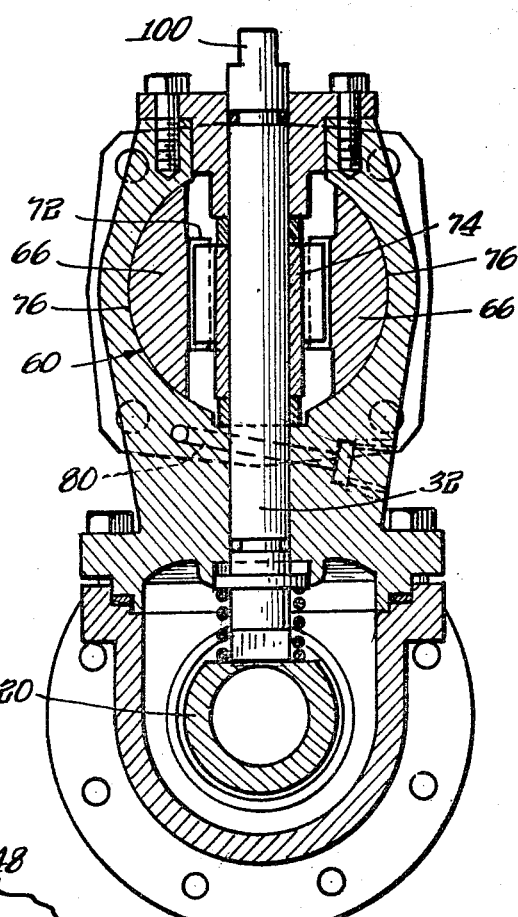
FIG. 3 is a vertical sectional view taken along the line 3—3 of FIG. 1.

Referring to the drawings in greater detail, the fluid pressure operated valve 10 forming the exemplary embodiment of the invention comprises a valve housing 12, FIG. 1, defining two passages 14, 16 opening into an internal valve chamber 18. Upon installation of the valve, the passages 14, 16 are connected with coacting conduits, or the like (not shown).

Communication of the passages 14, 16 with each other is controlled by means of a valve element 20, in this instance a valve ball, supported in the chamber 18 for rotation between valve open and valve closed positions. As shown, the valve ball 20 coacts with two annular valve seats 22, 24, supported on converging surfaces 26, 28 in encircling relation to the inner ends of the passages 14, 16 to connect the passages when the valve ball is in its valve open position and to block communication between the passages when the valve ball is in its valve closed position.

The valve ball 20 is rotated between its valve open and valve closed positions by the pressure of control fluid operating through the agency of extremely compact yet powerful control means which develops a "pure" valve operating torque about an axis coinciding with the rotary axis of the valve ball.

It may be noted with reference to FIG. 1 that the valve ball 20 is rotated about an axis, represented in this figure by a line 30, which is generally perpendicular to a line between the centers of the inner ends of the passages 14, 16.

The valve ball 20 is physically turned between its valve open and valve closed positions by an elongated operating shaft element 32 journalled in a removable cover element 34 forming a part of the valve housing 12. Rotary movement of the control shaft element 32 is transmitted to the valve ball 20 by the engagement in a slot 36 in the valve ball of a tang 38 on the inner end of the shaft element, which projects into the valve chamber 18. It may be noted in passing that the valve ball 20 is urged toward the converging ends of the valve seat support surfaces 26, 28 by a spring 40 encircling the inner end of the control shaft element 32 between the valve ball and an annular shoulder 42 on the valve control element.

The side of the annular shoulder 42 opposite from the spring 40 presses against an annular packing or seal 44 encircling the valve control element between the shoulder 42 and the cap 34. As will presently appear, the matter of sealing the valve against the escape of fluid from the chamber 18 along the control shaft element 32 is greatly simplified by the construction and operating characteristics of the fluid operated structure incorporated into the valve for rotating the shaft element.

The valve cap 34 is surmounted by a cylinder housing 46 defining an elongated internal cylinder 48, the axis 50 of which intersects the rotary axis 30 of the ball 20, and hence the axis of the operating shaft element 32, in perpendicular relation to the ball axis 30.

The control shaft element 32 extends transversely through the cylinder 48 midway between opposite ends of the cylinder, as shown. The ball valve end of the rotary control shaft 32 is journalled in a bore 52 extending through the cap 34 into the cylinder 48. The opposite or outer end of the shaft 32 is journalled in a bushing 54 mounted in the side of the cylinder housing 46 opposite from the cap 34. Opposite ends of the cylinder 48 are covered by removable caps 56, 58.

The pressure of control fluid supplied to the cylinder 48, in a manner to be described presently, is utilized to develop a valve operating torque about an axis coinciding with the common axis 30 of the shaft 32 and ball 20, which torque is applied to the shaft 32 in a manner that avoids the application of radial bearing loads on the simple structure which journals the shaft for rotation.

For this purpose, two opposed pistons 60, 62 are slidably disposed in opposite ends of the cylinder 48 as shown in FIGS. 1 and 2. The two pistons are identical in construction.

Each of the pistons 60, 62 is integrally formed in one piece and comprises a short cylindrical head portion 64, dimensioned diametrically to have a close sliding fit within the cylinder 48, and a single side skirt portion 66 integrally connected with one side of the piston head 64 and extending longitudinally toward the other piston in contiguous sliding engagement with the inner cylindrical surface of the cylinder 48 as shown in FIGS. 1 and 2. As viewed along the axis of the control shaft 32, which occupies an intervening position between the pistons, FIG. 2, each of the pistons 60, 62 has a generally L-shaped profile, in which the piston head portion 64 and the skirt portion 66 of each piston are integrally joined at a right angle to each other. Each piston skirt portion 66 has a shape in transverse section, as shown in FIG. 3, which conforms to a segment of the cross-sectional area of the cylinder 48, the segmental shape of the skirt portion in transverse section having a radial depth or thickness which is substantially less than the radius of the cylinder. As shown, the thickness of each cylinder skirt portion is approximately one-half the radius of the cylinder 48.

The two pistons 60, 62 are oriented rotatably within the cylinder 48 so that the skirt portions of the pistons are located in diametrically opposing relation to each other on opposite sides of the intervening control shaft 32. Moreover, the skirts 66 of the pistons are dimensioned to axially overlap each other when the pistons are displaced away from each other a maximum distance, which is limited in this instance by engagement of the pistons with abutments 68, 70 on the cylinder caps 56, 58, as shown in FIGS. 1 and 2.

The longitudinal side of each piston skirt 66 facing the opposing piston skirt is formed to define an elongated gear rack 72 parallel to the axis of the cylinder 48 and having a length which somewhat exceeds the displacement of each piston within the cylinder as will presently appear.

The two racks 72 formed on the respective pistons 60, 62 mesh with opposite sides of an intervening pinion 74 non-rotatably mounted on the axial portion of the shaft 32 extending transversely through the cylinder between the piston skirts, as shown. Hence, longitudinal movement of the pistons 60, 62 either toward or away from each other by the pressure of operating fluid, as will presently appear, serves to drive the pinion 74 rotatably to turn the shaft 32. The coacting structural parts, including the cylinder 48, racks 72, and the pinion 74 are dimensioned to provide a quarter turn of the shaft 32 and ball valve 20 upon movement of the pistons between two extreme longitudinal positions within the cylinder. As mentioned, movement of the pistons away from each other is limited by the abutments 68, 70. Movement of the pistons toward each other is terminated by engagement of the piston skirts 66 with the head portions 64 of the opposing pistons.

The teeth of the racks 72 have rolling contact with the teeth of the pinion 74, which avoids wear on these coacting elements. Any radially outward reaction of the pinion 74 on the skirt 66 of each piston is distributed over an extensive bearing area by which the skirt is supported by the inner surface of the cylinder 48. In this connection, it will be observed with reference to FIGS. 2 and 3 that each piston skirt 66, by virtue of its previously mentioned segmental shape in transverse section and its extensive length, has an extensive arcuate bearing surface 76 of segmental cylindrical shape extending along the full length of the skirt from the adjoined piston head 64 in sliding engagement with the inner surface of the cylinder. The extensiveness of the bearing surface 76 of each piston skirt distributes any radial bearing load on the piston skirt over such a large surface of the cylinder 48 that the bearing pressures are reduced to only a nominal value that does not subject the pistons and cylinder to wear as an incident to reciprocation of the pistons in the cylinder.

Valve operating fluid is supplied to the cylinder 48 for operating pistons 60, 62 through passages 78 formed in the cylinder housing 46 to communicate with the cylinder 48 between the pistons 60, 62, as shown in FIGS. 1 and 3, and through passages 80 formed in the cylindrical housing 46 to communicate with opposite ends of the cylinder beyond the respective pistons as shown in FIG. 1.

Figure 4:
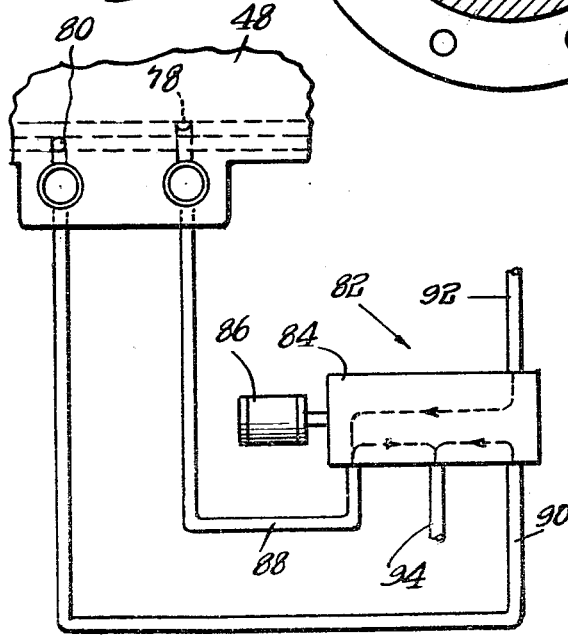
FIG. 4 is a generally schematic illustration of the fluid system used to control the valve.

The supply of operating fluid to the passages 78, 80 is controlled by a suitable fluid control system 82, illustrated schematically in FIG. 4, which, as shown, includes a four-way reversing valve 84 operated by a solenoid 86 and having independent connections 88, 90 with the respective passages 78, 80. The reversing valve 82 is supplied with operating fluid under pressure through a line 92 and has an exhaust outlet 94. The operating fluid can be air under pressure or a suitable hydraulic fluid supplied under pressure.

Operation of the valve 84 to supply fluid to the passages 78 to the cylinder 48 between the pistons while at the same time connecting the passages 80 at the opposite ends of the cylinder to exhaust effects simultaneous movement of the pistons away from each other. Shifting of the valve 84 to connect the passages 78 to exhaust while supplying fluid to the passages 80 effects movement of the pistons toward each other.

As explained, movement of the pistons toward and away from each other effects rotary displacement of the control shaft 32 in opposite directions to open and close the valve. The forces exerted by the two racks 70 on opposite sides of the pinion 74, as an incident to fluid pressure operation of the pistons, are mutually parallel and equal. Moreover, any radial reaction of one rack 72 on the pinion 74 is balanced by an opposite reaction of the same magnitude of the other rack on the pinion.

Thus, the structure operates to generate an operating torque about an axis coincident with the axis of the shaft 32 and applies this torque to operate the shaft 32 while completely avoiding the application of radial force to either the pinion 74 or the shaft 32 which must be sustained by the supports which journal the shaft. Moreover, it is evident that neither the shaft 32 nor any of the control structure rotatable with the shaft is subjected to bending forces.

The avoidance of the application to the shaft 32 of bending forces and radial forces which must be sustained by the shaft supports effectively eliminates wear on the shaft and its supports and makes possible a more effective sealing of the shaft to avoid the escape of fluid from either the valve chamber 18 or the cylinder 48 over a long service life. As shown, the control shaft 32 is effectively sealed by two rather simple seals 96, 98 encircling the shaft within the bushing 54 and bore 52, respectively. These seals, together with the previously mentioned packing 44, which seals against possible high pressures in the valve chamber 18, are not subjected to wear by forces on the shaft and maintain their effectiveness over a long service life.

The valve 10 can be operated manually by applying a suitable hand tool to a tang 100 on the outer end of the shaft 32 which projects beyond the bushing 54.

Figure 5:
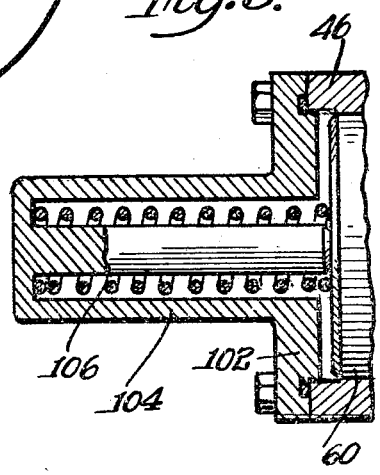
FIG. 5 is a fragmentary sectional view illustrating the incorporation into the valve of structure which effects operation of the valve automatically as necessary to effect a safe condition of the valve in the event of a loss of operating fluid pressure.

Automatic movement of the valve ball 20 to either an open valve or closed valve position in the event of a loss of operating fluid pressure can be provided by incorporating into the valve spring means which, as shown in FIG. 5, serves to urge the pistons 60, 62 toward each other. FIG. 5 shows the previously mentioned cylinder cap 56 replaced by a cylinder cap 102 having an axially protruding boss 104 housing a compression spring 106 which acts against the piston 60. Preferably, the addition of the spring 106 with its supporting cap 102 is duplicated at the opposite end of the cylinder housing 46 to act on the other piston 62. In the alternative, suitable springs may be mounted between the pistons 60, 62 to urge the pistons apart.

In any event, the spring means which acts on the pistons is designed to urge the valve to an open or closed condition, which condition provides the greater degree of safety in the environment in which the valve is used.

It will be understood that the invention is not necessarily limited to the precise construction of the exemplary embodiment illustrated, but includes variants and alternatives within the spirit and scope of the invention as defined by the claims.

The invention is claimed as follows:

1. A fluid operated valve comprising, in combination, a valve housing defining a valve chamber open at one side of the housing and defining two flow passages opening into said chamber, a rotary flow control valve element rotatably disposed in said chamber, two valve seats encircling the inner ends of said respective passages and engaging opposite sides of said valve element, a unitary valve component forming a fluid power cylinder and including a valve bonnet portion integral with the cylinder and extending from one side of the cylinder, said unitary valve component being detachably secured to said valve housing to effect a closed covering of the open side of said chamber by said bonnet portion of said component, said component defining a shaft bore therein axially aligned with the center axis of rotation of said valve element and extending from said chamber into said cylinder so that the axes of the bore and cylinder intersect in mutually perpendicular relation to each other, means on said valve component defining a shaft bearing supported at the side of said cylinder generally opposite from said bore in coaxial alinement with said bore, a control shaft journaled in said bearing and in said bore to traverse said cylinder and project into said chamber with the opposite end of said shaft projecting beyond the shaft bearing and being shaped for manual operation to rotate said valve element between open and closed positions, the chamber end of said shaft and said valve element being shaped to separably interfit in rotary driving relation to each other, sealing means coacting with said shaft to prevent the escape of fluid therealong from either said chamber or said cylinder along said shaft bearing, a straight pinion nonrotatably mounted on said shaft within said cylinder, means closing opposite ends of said cylinder, two pistons slidably mounted in said cylinder on opposite sides of said pinion, two racks integrally formed on said respective pistons and meshing with opposite sides of said pinion for supplying substantially balanced torque to said shaft means through said pinion with substantial elimination of misaligning loads on the shaft means whereby to maintain the effectiveness of said sealing means, and operating fluid valve means connected with said cylinder between said pistons and with opposite ends of said cylinder beyond said pistons to effect fluid pressure movement of said pistons toward and away from each other to rotate said valve element between valve open and valve closed positions.

2. A fluid operated valve comprising, in combination, a valve housing defining a valve chamber open at one side of the housing and defining two flow passages opening into said chamber, a rotary flow control valve element rotatably disposed in said chamber, two valve seats encircling the inner ends of said respective passages and engaging opposite sides of said valve element, a valve component forming a fluid power cylinder and including a valve bonnet portion rigid with the cylinder at one side thereof, means detachably securing said valve component to said valve housing to effect a closed covering of the open side of said chamber by said bonnet portion of said component, said component defining a shaft bore therein axially aligned with the center axis of rotation of said valve element and opening into said chamber and opening into said cylinder in a position such that the axes of the bore and cylinder intersect in mutually perpendicular relation to each other, means on said valve component defining a shaft bearing supported at the side of said cylinder generally opposite from said bore in coaxial alinement with said bore, rotary shaft means journaled in said bearing and in said bore to traverse said cylinder and project into said chamber with the opposite end of said shaft means projecting beyond said shaft bearing and being shaped for manual operation to rotate said valve element between open and closed positions thereof, the chamber end of said shaft means and said valve element being shaped to separably interfit in rotary driving relation to each other, sealing means encircling said shaft means between said chamber and said cylinder and sealing means encircling said shaft means between said cylinder and the projecting end of the shaft means to prevent escape of fluid along said shaft means from either said chamber or said cylinder, a straight pinion nonrotatably mounted on said shaft means within said cylinder, means closing opposite ends of said cylinder, two pistons slidably mounted in said cylinder on opposite sides of said pinion, two racks operated by said respective pistons and meshing with opposite sides of said pinion for supplying substantially balanced torque to said shaft means through said pinion with substantial elimination of misaligning loads on the shaft means whereby to maintain the effectiveness of both said sealing means, and operating fluid valve means connected with said cylinder between said pistons and with opposite ends of said cylinder beyond said pistons to effect fluid pressure movement of said pistons toward and away from each other to rotate said valve element between valve open and valve closed positions thereof.

References Cited in the file of this patent

UNITED STATES PATENTS

| | | |
|---|---|---|
| 955,896 | Morrison | Apr. 26, 1910 |
| 1,805,668 | Kelley | May 19, 1931 |
| 2,092,261 | Rector | Sept. 7, 1937 |
| 2,149,725 | Canariis | Mar. 7, 1939 |
| 2,152,651 | Kinzie | Apr. 4, 1939 |
| 2,788,019 | Mottram | Apr. 9, 1957 |
| 2,848,056 | Herbenar | Aug. 19, 1958 |
| 2,963,262 | Shafer | Dec. 6, 1960 |
| 2,974,921 | Kaswan | Mar. 14, 1961 |

FOREIGN PATENTS

| | | |
|---|---|---|
| 508,735 | Germany | of 1930 |